United States Patent
Natsume

(10) Patent No.: US 7,813,053 B2
(45) Date of Patent: Oct. 12, 2010

(54) LENS APPARATUS

(75) Inventor: Satoshi Natsume, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 12/400,467

(22) Filed: Mar. 9, 2009

(65) Prior Publication Data

US 2009/0231729 A1 Sep. 17, 2009

(30) Foreign Application Priority Data

Mar. 11, 2008 (JP) .............................. 2008-060934

(51) Int. Cl.
G02B 15/14 (2006.01)
(52) U.S. Cl. ...................... 359/698; 359/696
(58) Field of Classification Search .................. 359/698
See application file for complete search history.

(56) References Cited

U.S. PATENT DOCUMENTS

| 5,930,054 | A | 7/1999 | Kasuya |
| 7,218,849 | B2 | 5/2007 | Hirai |
| 7,265,914 | B2 | 9/2007 | Hirai |
| 2002/0001138 | A1* | 1/2002 | Fukita et al. ................. 359/696 |
| 2005/0219710 | A1* | 10/2005 | Hirai .......................... 359/689 |

* cited by examiner

*Primary Examiner*—Jordan M. Schwartz
*Assistant Examiner*—James C Jones
(74) *Attorney, Agent, or Firm*—Canon U.S.A., Inc. I.P. Division

(57) ABSTRACT

A lens apparatus including an optical element includes a motor configured to drive the optical element; a position detector configured to detect a relative position of the optical element; and a controller configured to detect an origin of the optical element by returning the optical element to the origin by controlling the motor. The controller controls the motor so that a speed of the optical element moving to the origin is higher than a speed of the optical element moved by an operation of an operator.

9 Claims, 14 Drawing Sheets

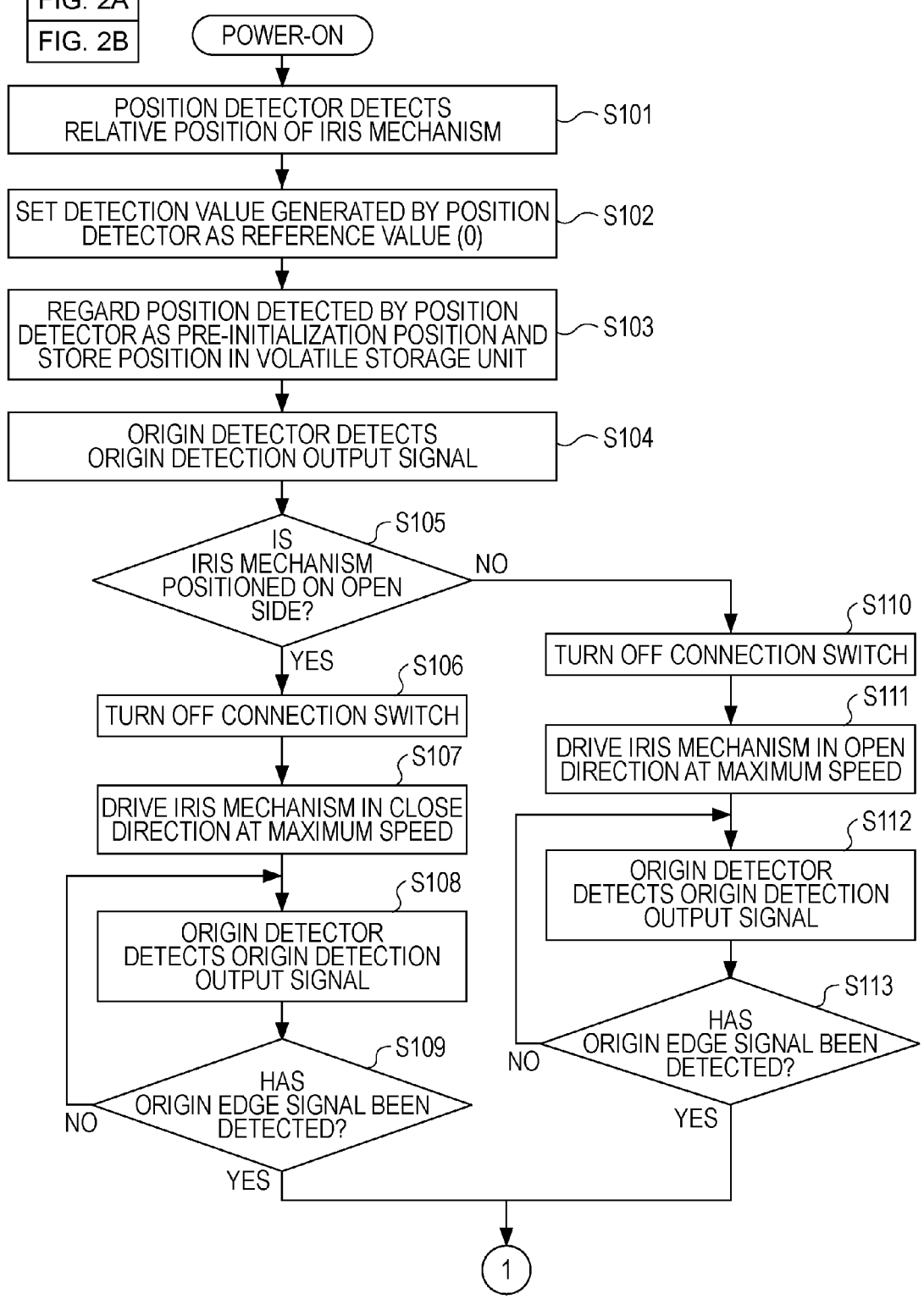

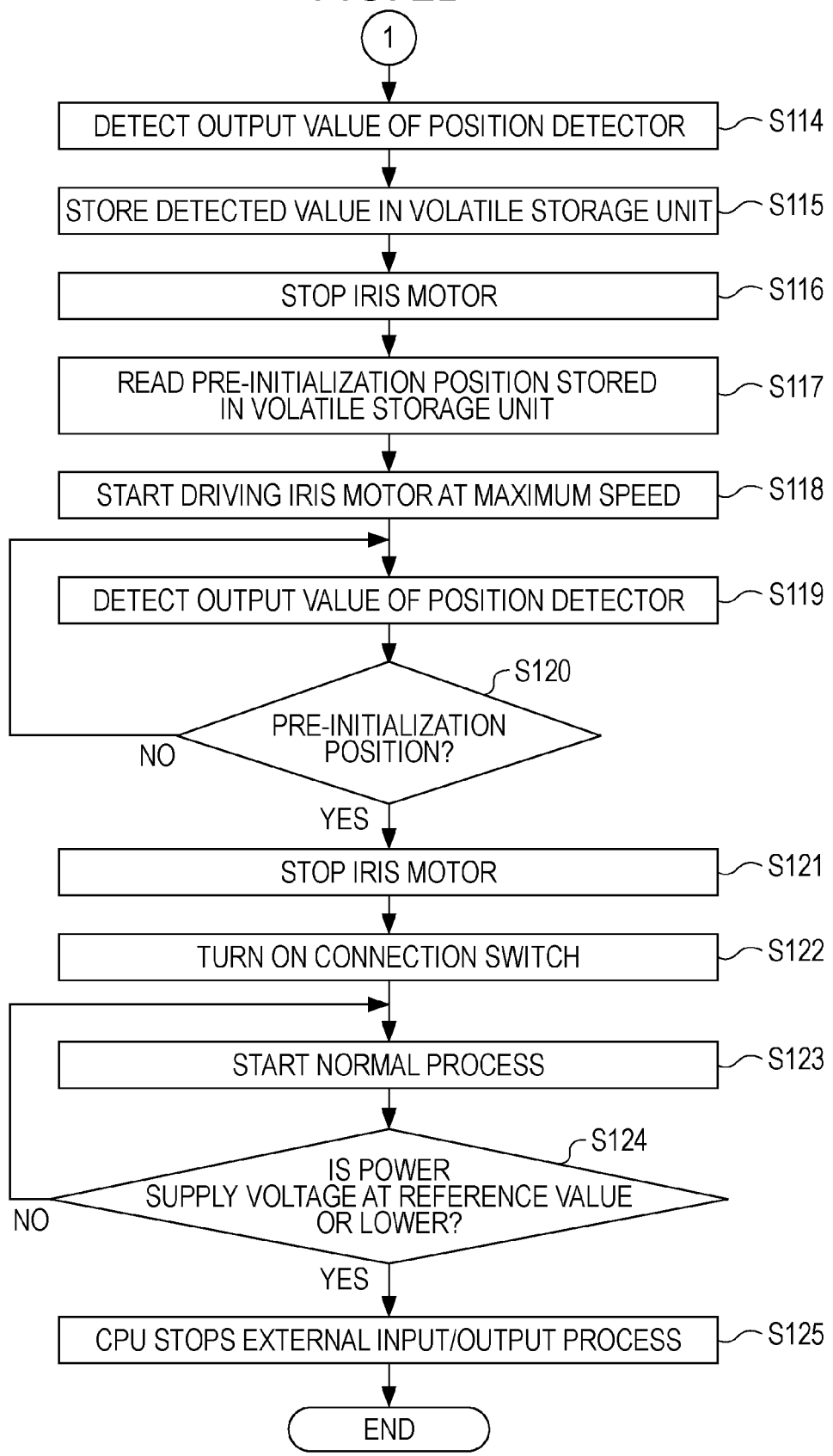

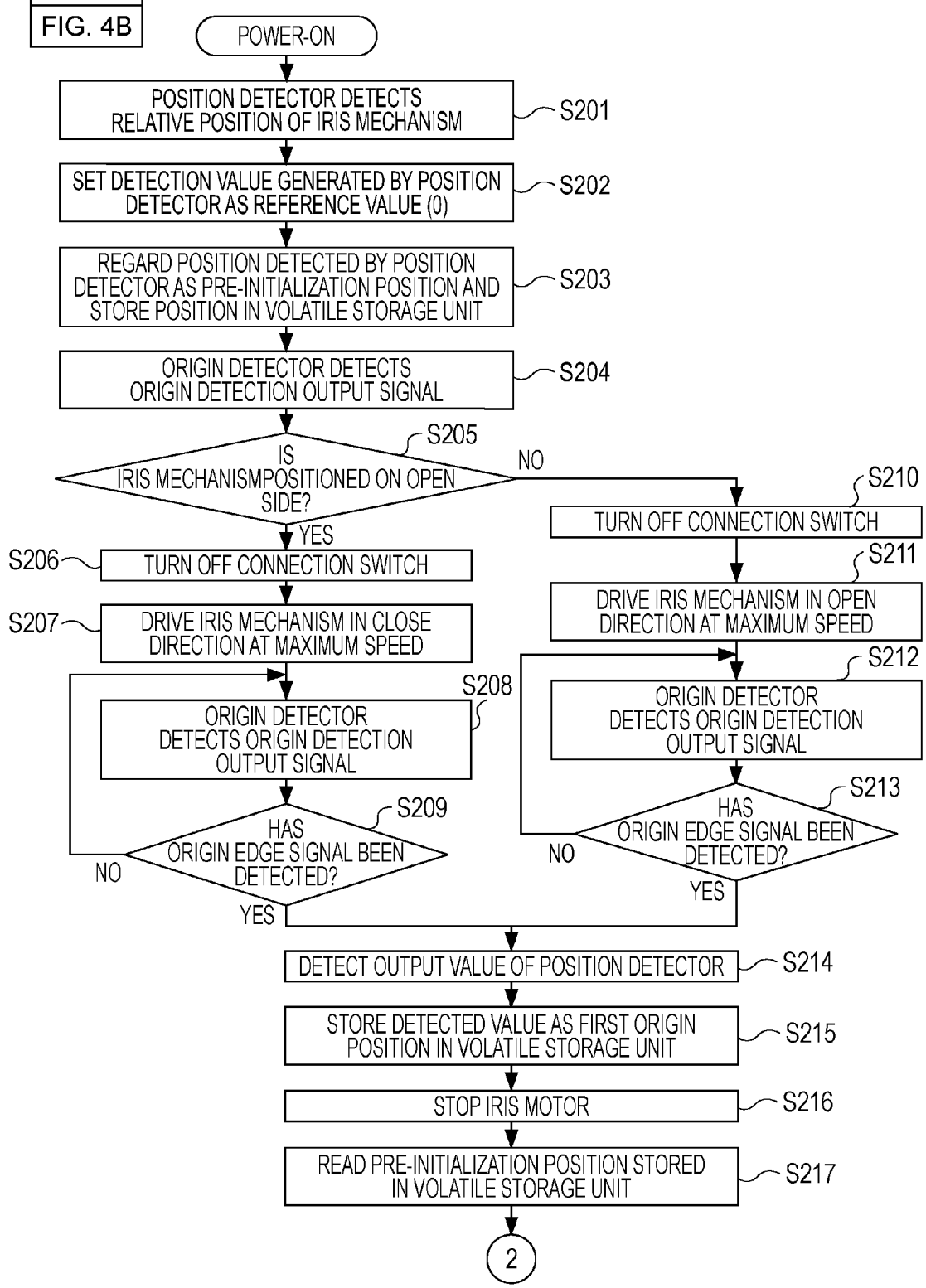

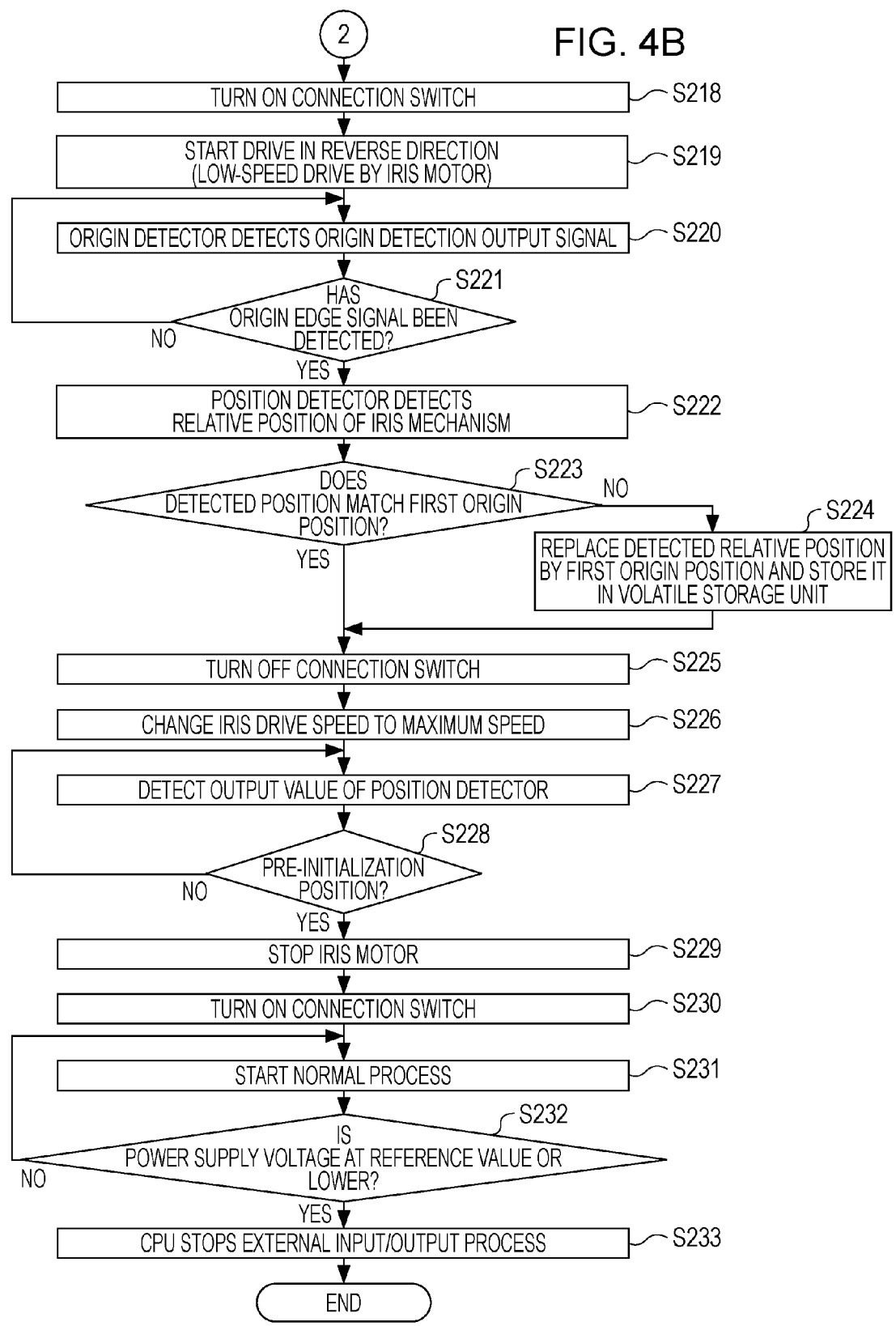

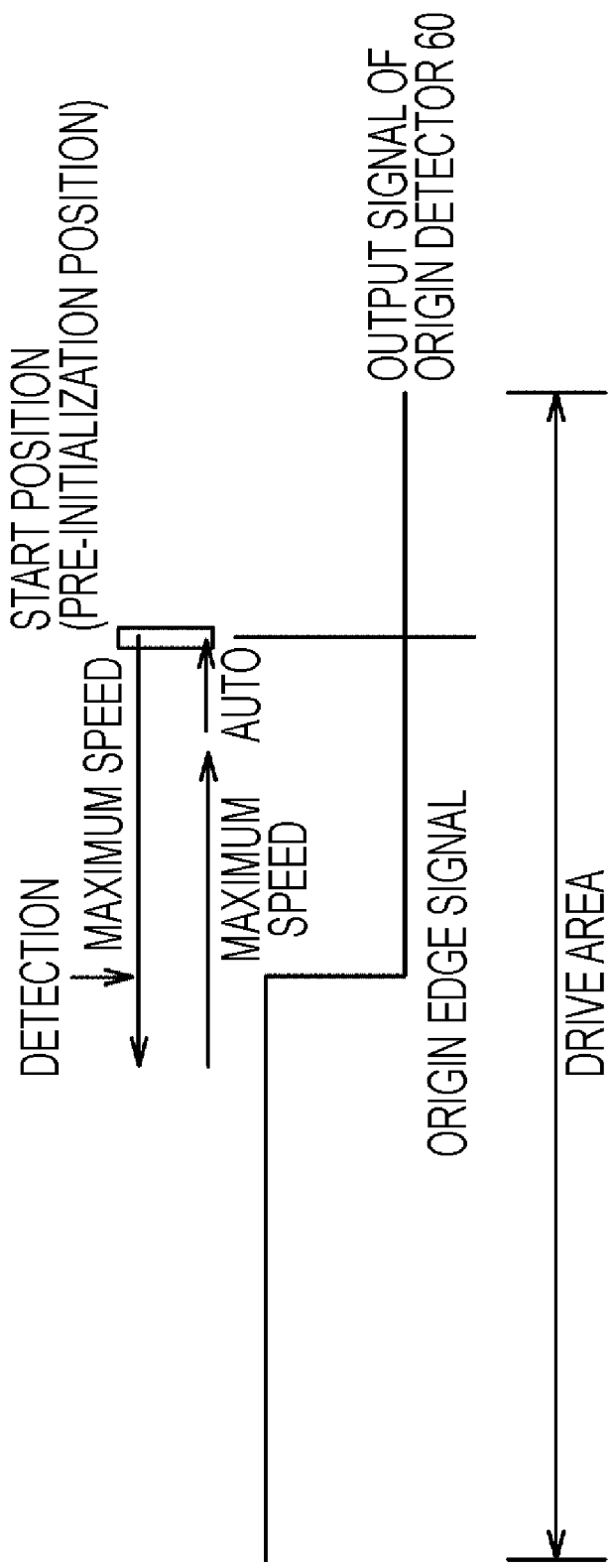

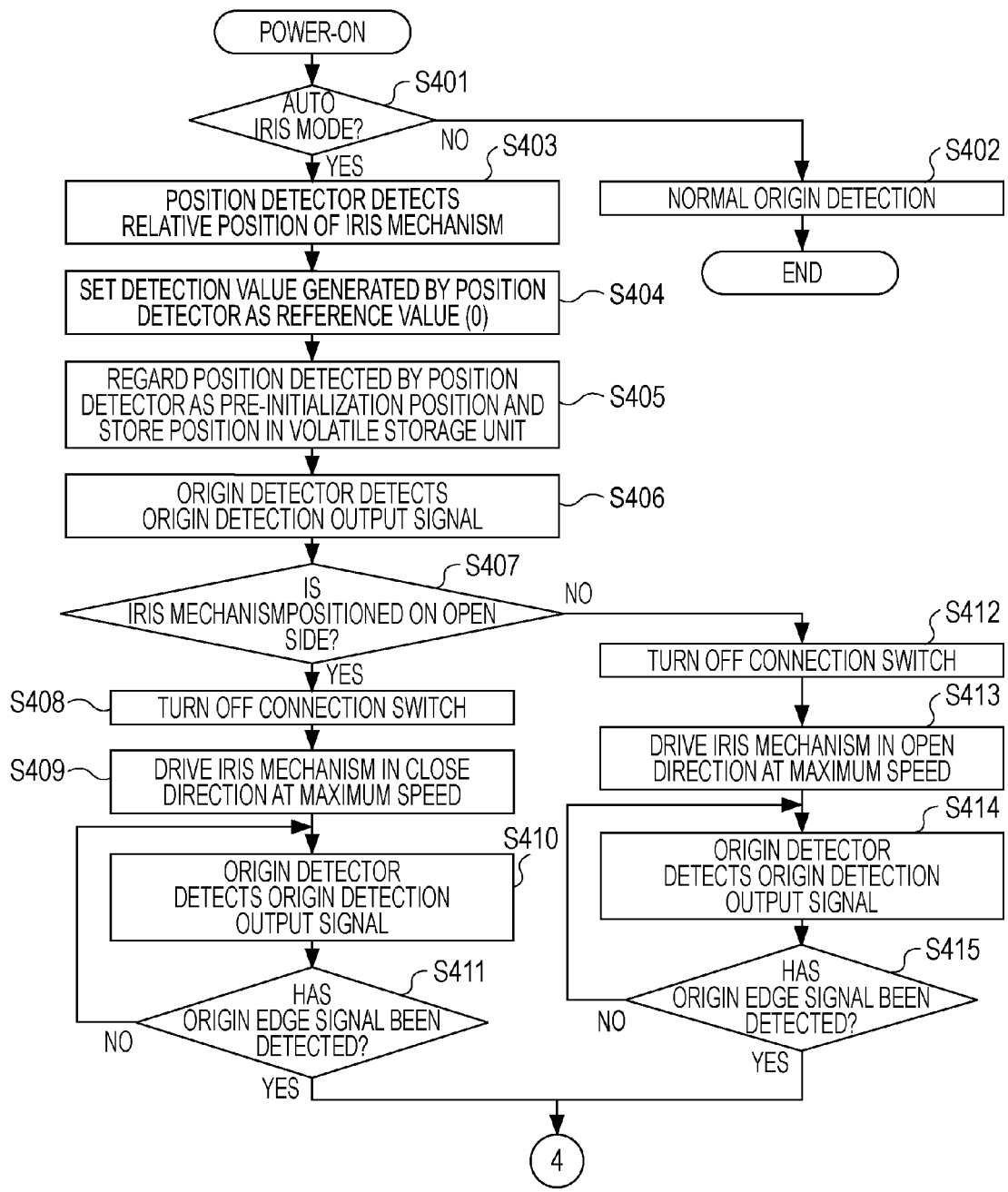

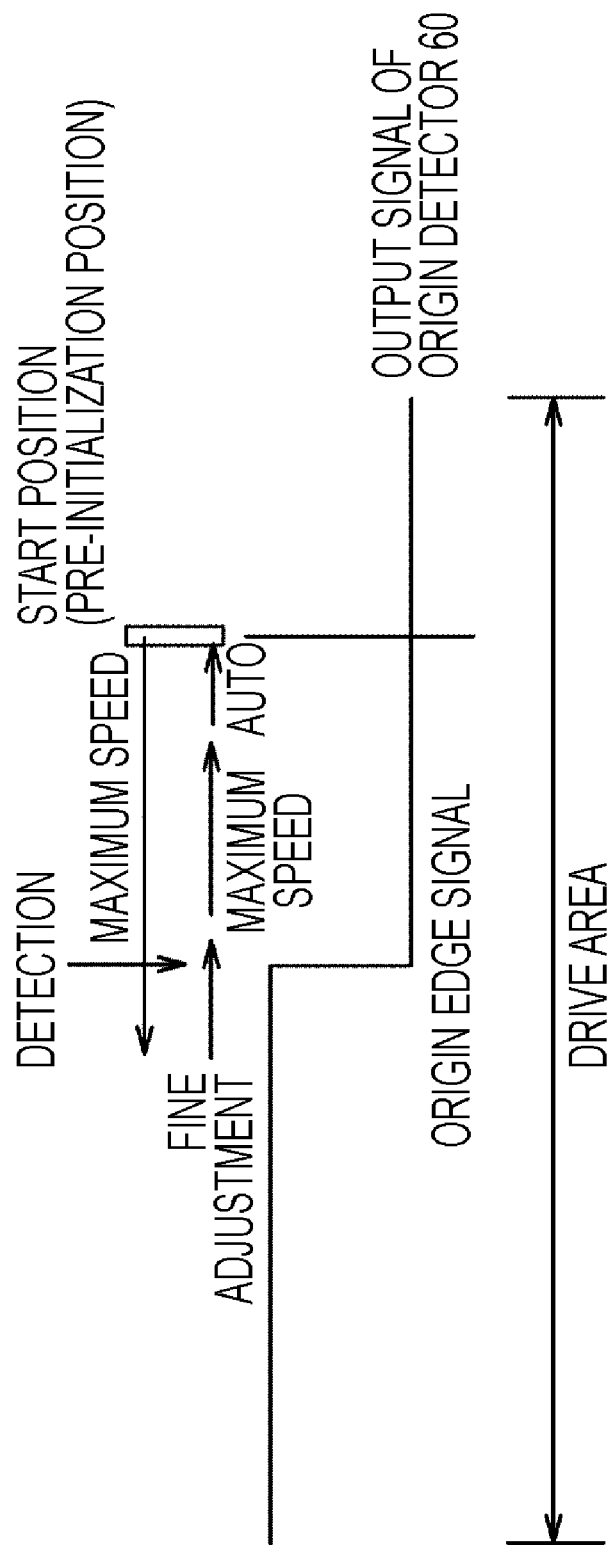

LENS APPARATUS

BACKGROUND OF THE INVENTION

1. Field of the Invention

The present invention relates to a lens apparatus used for television broadcast.

2. Description of the Related Art

In recent years, more sophisticated control has been demanded for a lens system of a television camera used in broadcast, such as an ENG (Electronic News Gathering) camera used in reporting, relaying, dramas, varieties, documentaries, and so on. For satisfaction of such demand, there has been suggested a lens system including a computing device such as a microcomputer (CPU: Central Processing Unit) and controlling the position of a lens. In such a lens system, an encoder is often used instead of a potentiometer, which is a position detector mainly used in a conventional lens, in view of the easiness of processes performed when a microcomputer is used in order to perform position control with higher precision.

For example, U.S. Pat. No. 5,930,054 discloses a technique of detecting a relative position by using a compact and inexpensive incremental encoder and also using an absolute position detector to detect an absolute position, such as a potentiometer. In this case, a datum point can be detected in short time without an influence of backlash or the like, whereby highly-precise lens control can be performed.

On the other hand, U.S. Pat. No. 7,218,849 realizes highly-precise position detection of a lens by automatically initializing an absolute position every time the power is turned on with the use of a relative position detector, such as an optical incremental sensor or a magnetic incremental sensor, and an origin detector. An operation of initializing an absolute position performed by a photographer every time the power is turned on is omitted, so that the photographer can start shooting immediately after power-on, while a highly-precise operation of the lens is realized.

Also, the position of the lens is detected and stored and the absolute position is automatically initialized every power-on with the use of the relative position detector and the origin detector. Then, after the initialization has been completed, the lens is returned to the stored position. In this way, the initialization that is automatically performed after power-on prevents that a picture not intended by the photographer is shown after power-on, so that a highly-precise operation of the lens is realized.

However, in the camera systems according to the related arts, the time from when power is turned on until when an image can be recorded is about 10 seconds. Larger capacity and lower cost of memories in recent years enable the memories to be loaded in television cameras, so that images can be recorded. This type of product is capable of recording images in a memory upon power-on. Therefore, if detection of an origin (i.e. initialization) is performed at a currently-used normal servo drive speed, the lens performs an operation not intended by the photographer and unusable images are recorded for a long time, which should be improved.

Particularly, in iris control, exposure is not accurately controlled without detection of an iris position and thus detection of an origin is necessary. However, an operation of the iris performed at detection of the origin causes unnecessary change in exposure, resulting in inconvenience.

In the techniques according to the above-mentioned patent documents, detection of an origin at power-on is performed at the speed enabling a driving motor to move the lens with an operation by an operating member in the state where the lens apparatus connects to a camera.

SUMMARY OF THE INVENTION

A lens apparatus according to an embodiment of the present invention includes an optical element. The lens apparatus includes a motor configured to drive the optical element; a position detector configured to detect a relative position of the optical element; and a controller configured to detect an origin of the optical element by returning the optical element to the origin by controlling the motor. The controller controls the motor so that a speed of the optical element moving to the origin is higher than a speed of the optical element moved by an operation of an operator.

Further features of the present invention will become apparent from the following description of exemplary embodiments with reference to the attached drawings.

BRIEF DESCRIPTION OF THE DRAWINGS

FIG. 2 is a flowchart of operations according to the first embodiment.

FIG. 4 is a flowchart of operations according to a second embodiment.

FIG. 7 illustrates an operation according to the third embodiment.

FIG. 10 illustrates an operation according to the fourth embodiment.

DESCRIPTION OF THE EMBODIMENTS

The present invention is directed to overcoming the above-described problems and providing a lens apparatus with reduced unnecessary operations by increasing a drive speed at detection of an origin of a lens.

A lens apparatus according to an embodiment includes an optical element such as a zoom lens unit, a focus lens unit, or a variable aperture (iris); a position detector to detect a relative position of the optical element; a motor to drive the optical element; and a controller to control the motor. Here, at power-on or at other appropriate timing (e.g., operation by an operator), the optical element is returned to an origin, whereby an absolute position of the optical element (the position of the optical element with respect to the lens apparatus) is detected. By using this detection result and the detection result of the position detector, the absolute position of the optical element can be constantly recognized, so that the lens apparatus can be appropriately controlled.

Here, the controller to control the motor allowing the optical element to return to the origin allows the speed of the optical element moving to the origin to be higher than a normal speed (the speed of the optical element moved by an operation of an operator or maximum movement speed). Furthermore, the controller allows the speed of the optical element returning from the origin to an original position to be higher than the above-described normal speed. Note that, when at least part of the speed of the optical element returning to the original position exceeds the normal speed, some effects can be obtained.

Assume that the above-described optical element is a variable aperture. The lens apparatus (image pickup apparatus) has an operation mode called an auto iris mode where the variable aperture is automatically adjusted so that the quantity of light that reaches the main body of the image pickup apparatus through the lens apparatus does not significantly changes (substantially constant). In this embodiment, the auto iris mode is executed before the variable aperture completely returns from the origin to the original position (before the variable aperture reaches the original position), whereby the continuity of operations performed after the variable aperture has returned to the original position is ensured. Of course, the movement of the variable aperture means the movement of blades (light-shielding blades) in the variable aperture. The blades in the variable aperture move in the direction vertical to an optical axis, whereby the opening diameter of the variable aperture is changed (adjusted).

Hereafter, embodiments of the present invention are described in detail with reference to the drawings.

Figure 1:
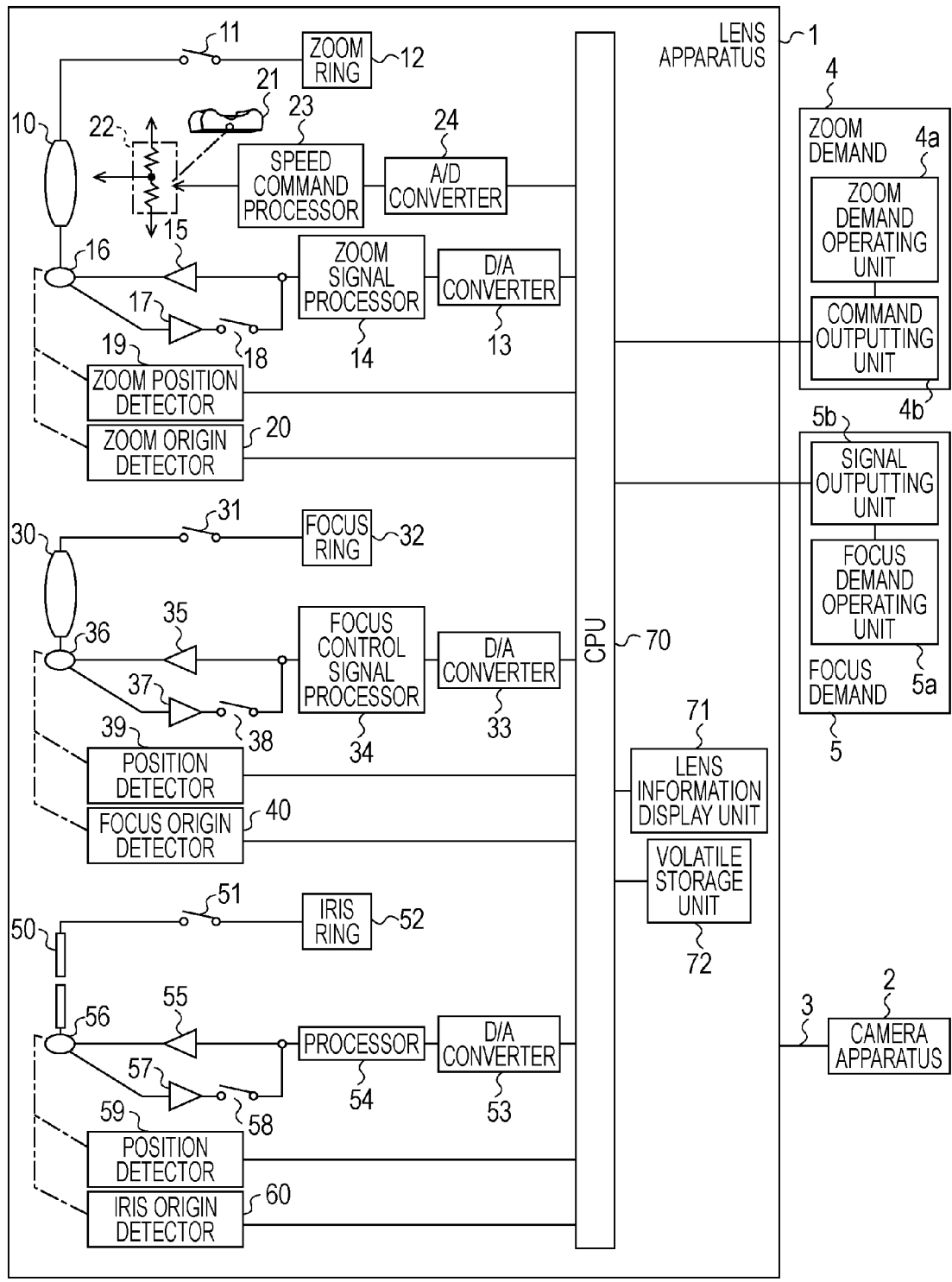
FIG. 1 is a block circuit configuration diagram according to a first embodiment.

FIG. 1 is a block circuit diagram illustrating a configuration of a lens apparatus 1 according to a first embodiment. The lens apparatus 1 including a lens barrel and a drive unit is fixed to a camera apparatus 2, and electric signals are transmitted therebetween through a lens cable (or a contact) 3. Furthermore, the lens apparatus 1 connects to a zoom demand 4 and a focus demand 5.

The lens apparatus 1 includes a zoom lens unit (zoom optical system) 10, a focus lens unit (focus optical system) 30, an iris mechanism (variable aperture mechanism) 50, and a CPU 70. The CPU 70 connects to a lens information display unit 71 to display lens information and a volatile storage unit 72.

The zoom lens unit 10 connects to an output of a zoom ring 12 including a moving ring via a zoom clutch 11. An output of the CPU 70 connects to a zoom motor 16 to drive the zoom lens unit 10 via a D/A converter 13, a zoom signal processor 14, and a power amplifier 15 to amplify power (voltage) to be applied to the zoom motor 16. An output of the zoom motor 16 is fed back to an input side of the power amplifier 15 via an amplifier 17 to amplify a feedback signal from the zoom motor 16 and a connection switch 18 to determine whether the feedback signal from the zoom motor 16 is to be connected. The zoom motor 16 is provided with a zoom position detector 19 to detect a relative position of the zoom lens unit 10 and a zoom origin detector 20 to detect an origin of the zoom lens unit 10, and the outputs thereof connect to the CPU 70. The zoom position detector 19 may substantially detect the position of the zoom lens unit 10. Specifically, the zoom position detector 19 may detect the position of a member that moves together with the zoom lens unit 10 or the position of a member that moves in conjunction with a movement of the zoom lens unit 10. This is the same for the other position detectors in this embodiment. The detection of the origin means detecting an absolute position of the zoom lens unit 10 (the position relative to the lens apparatus) by returning the zoom lens unit 10 to the origin (moving the zoom lens unit 10 to the origin (datum point)). In this embodiment, the zoom lens unit 10 is moved to the origin and is then returned to an original position (the position before return to the origin or the position before initialization).

Furthermore, an output of a zoom switch 21 connects to a speed command generator 22 to generate a speed command signal supplied to the zoom lens unit 10, and an output of the speed command generator 22 connects to the CPU 70 via a speed command processor 23 and an A/D converter 24. The speed command generator 22 includes an analog detector such as a potentiometer or a digital detector such as a rotary encoder.

Rotating the zoom ring 12 causes the zoom lens unit 10 held thereby to move forward/backward along an optical axis, whereby zoom adjustment can be performed. The zoom clutch 11 switches between electric drive and manual drive of the zoom lens unit 10. The speed command generator 22 outputs a speed command signal to specify a zoom drive direction and a zoom drive speed proportional to an operation amount of the zoom switch 21 in order to servo-drive the zoom lens unit 10. The speed command processor 23 performs level/shift conversion on the speed command signal so that the signal is taken into the CPU 70 via the A/D converter 24.

The D/A converter 13 performs D/A conversion on a signal that is output to servo-drive the zoom lens unit 10 from the CPU 70 and that controls the zoom motor 16. The zoom signal processor 14 performs level/shift conversion on the zoom control signal on which D/A conversion has been performed by the D/A converter 13. The power amplifier 15 drives the zoom motor 16, the zoom motor 16 drives the zoom lens unit 10, and the zoom lens unit 10 performs scaling of the lens apparatus 1.

The amplifier 17 detects and amplifies the angular velocity of the zoom motor 16, and the connection switch 18 feeds back the output thereof to a negative terminal of the power amplifier 15 and controls connection of a speed feedback control system. When the connection switch 18 is closed, the feedback circuit is in a connected control state. When the connection switch 18 is opened, the feedback circuit is in an open control state.

The zoom position detector 19 outputs a zoom position signal corresponding to a relative position of the zoom lens unit 10 and includes an optical incremental sensor or a magnetic incremental sensor. The zoom origin detector 20 detects an origin position of the zoom lens unit 10 as an absolute value. The zoom origin detector 20 sets a boundary position between reflection and non-reflection of an LED (Light Emitting Diode) as the origin position, and includes an edge detector or the like capable of detecting that the position of the zoom lens unit 10 is on the tele side when reflection occurs and that the position of the zoom lens unit 10 is on the wide side when no reflection occurs.

The zoom demand 4 connects to the CPU 70 of the lens apparatus 1. A zoom demand operating unit 4a operates the angle of the zoom demand 4 so as to operate and control the zoom lens unit 10. A command outputting unit 4b includes a potentiometer or an analog detector of volume and so on, and detects a zoom drive position signal proportional to an operation rotation angle of the zoom demand operating unit 4a.

The focus lens unit 30 connects to an output of a focus ring 32 including a moving ring via a focus clutch 31. An output of the CPU 70 connects to a focus motor 36 to drive the focus lens unit 30 via a D/A converter 33, a focus control signal processor 34 to process a control signal supplied to the focus lens unit 30, and a power amplifier 35 to amplify the power to be applied to the focus lens unit 30. An output of the focus motor 36 connects to an input side of the power amplifier 35 via an amplifier 37 and a connection switch 38. Also, the focus motor 36 is provided with a position detector 39 to detect a relative position and a focus origin detector 40 to detect an origin of the focus lens unit 30, and the outputs thereof connect to the CPU 70.

The position detector 39 outputs a relative position signal corresponding to a relative position of the focus lens unit 30 and includes an optical incremental sensor or a magnetic incremental sensor. The focus origin detector 40 detects an origin position of the focus lens unit 30 as an absolute value and includes an edge detector or the like using reflection and non-reflection of an LED.

Rotating the focus ring 32 causes the focus lens unit 30 to move forward/backward along an optical axis, whereby focus adjustment can be performed. The focus clutch 31 switches between electric drive and manual drive of the focus lens unit 30 by demand.

The D/A converter 33 performs D/A conversion on a focus control signal output to servo-drive the focus lens unit 30 from the CPU 70. The focus control signal processor 34 performs level/shift conversion on the focus control signal on which D/A conversion has been performed by the D/A converter 33. The power amplifier 35 drives the focus motor 36 so as to drive the focus lens unit 30.

The focus demand 5 connects to the CPU 70 of the lens apparatus 1, and a focus demand operating unit 5a operates and controls the focus lens unit 30. A focus demand command signal outputting unit 5b of the focus demand 5 includes a potentiometer or an analog detector of volume and so on, and detects a focus position signal proportional to an operation rotation angle of the focus demand operating unit 5a.

With the focus demand 5 being connected, a focus position command signal generated by an operation of the focus demand operating unit 5a is taken into the CPU 70 and is used as a focus control signal. The focus control signal is output from the above-described D/A converter 33 and the focus motor 36 drives the focus lens unit 30.

The amplifier 37 to amplify a feedback signal from the focus motor 36 amplifies a signal based on a detection result of angular velocity of the focus motor 36. The connection switch 38 feeds back the output of the amplifier 37 to a negative terminal of the power amplifier 35 to amplify the power to the focus motor 36 and controls the connection of a speed feedback control system. When the connection switch 38 is closed, the feedback circuit is in a connected control state. When the connection switch 38 is opened, the feedback circuit is in an open control state.

The iris mechanism (variable aperture mechanism) 50 connects to an output of an iris ring 52 (aperture adjusting member, the shape thereof is not necessarily a ring shape) including a moving ring via an iris electrical/manual switch 51. An output of the CPU 70 connects to an iris motor 56 to drive the iris mechanism 50 via a D/A converter 53, a processor 54, and a power amplifier 55. An output of the iris motor 56 is fed back to an input side of the power amplifier 55 via an amplifier 57 and a connection switch 58. Furthermore, the iris motor 56 is provided with a position detector 59 to detect a relative position of the iris and an iris origin detector 60 to detect an origin of the iris, and the outputs thereof connect to the CPU 70.

Rotating the iris ring 52 enables an iris diameter of the iris mechanism 50 to be adjusted. The iris electric/manual switch 51 switches between electric drive and manual drive of the iris mechanism 50.

The iris mechanism 50 adjusts the quantity of incident light of the lens apparatus 1. The position detector 59 includes an optical incremental sensor or a magnetic incremental sensor and outputs an iris relative position signal corresponding to an absolute position of the iris mechanism 50. The iris origin detector 60 includes an edge detector using reflection and non-reflection of an LED and detects an origin position of the iris mechanism 50 as an absolute value.

The D/A converter 53 performs D/A conversion on an iris control signal output to servo-drive the iris mechanism 50 from the CPU 70. The processor 54 performs level/shift conversion on the iris control signal output from the D/A converter 53, and the power amplifier 55 drives the iris motor 56 so as to drive the iris mechanism 50.

The amplifier 57 amplifies a signal based on detected angular velocity of the iris motor 56. Then, the connection switch 58 feeds back the signal amplified by the amplifier 57 to a negative terminal of the power amplifier 55 and controls connection of a speed feedback control system. When the connection switch 58 is closed, the feedback circuit is in a connected control state. When the connection switch 58 is opened, the feedback circuit is in an open control state.

The lens information display unit 71 displays various operation states of the lens apparatus 1. The volatile storage unit 72 stores various pieces of information of the lens apparatus 1.

This embodiment is effective to detect the respective origins of the zoom lens unit 10, the focus lens unit 30, and the iris mechanism 50. Here, detection of an origin of the iris mechanism 50 is described as a representative example.

FIG. 2 is a flowchart illustrating operations performed in the iris mechanism 50. In step S101, the position detector 59 detects a current relative position of the iris mechanism 50. In step S102, a detection value generated by the position detector 59 is set as a reference value of zero. In step S103, this position is regarded as a pre-initialization position and is stored in the volatile storage unit 72. In step S104, the iris origin detector 60 detects an origin detection output signal. In step S105, it is determined whether the iris mechanism 50 is positioned on an open side or a close side with respect to the origin on the basis of the detection result generated by the iris origin detector 60.

Figure 3:
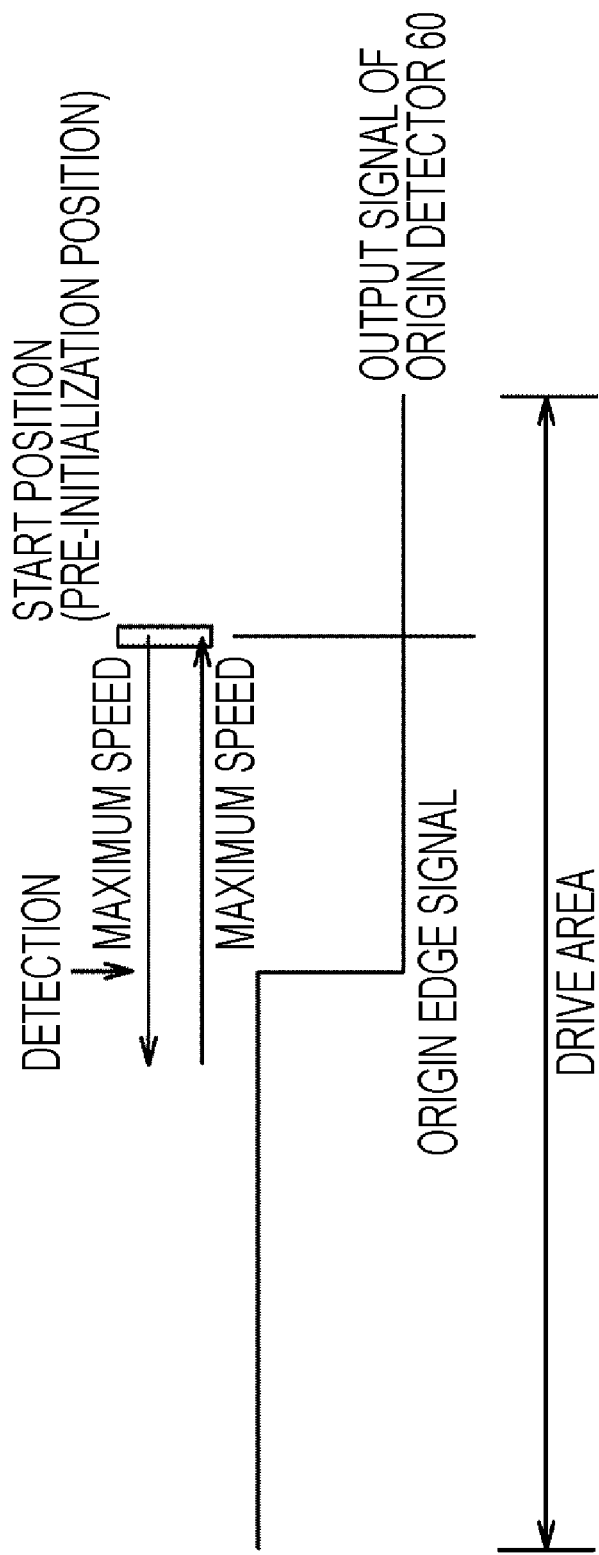
FIG. 3 illustrates an operation according to the first embodiment.

More specifically, as illustrated in FIG. 3, the iris mechanism 50 outputs an origin edge signal only once while moving in a drive area from one end to the other end, which causes a change from a high level to a low level or from a low level to a high level. On the basis of this signal, the iris origin detector 60 determines whether the iris mechanism 50 is positioned on the open side or the close side at power-on.

As a result of the determination, if the iris mechanism 50 is positioned on the open side (YES in step S105), the process proceeds to step S106. If the iris mechanism 50 is positioned on the close side (NO in step S105), the process proceeds to step S110. In step S106, the connection switch 58 is turned off so that detection of the origin can be performed at a possible maximum speed by motor drive. At normal servo, the feedback circuit operates and controls the speed so that an optimum speed for specified iris drive can be realized.

However, at detection of the origin, the connection switch 58 is turned off so that detection of the origin and return to the initial position can be performed in the shortest time. In some cases, the feedback circuit is not formed and speed control is performed only by a control signal from the CPU 70. In those cases, however, an output signal from the CPU 70 is controlled so that the iris motor 56 drives at a possible maximum speed.

In step S107, the iris mechanism 50 is driven in the close direction at the maximum speed. In step S108, the iris origin detector 60 detects an origin detection output signal. In step 109, it is determined whether an origin edge signal has been detected on the basis of the detection result. If the origin edge signal has not been detected (NO in step S109), the process returns to step S108 and detection is continued. If the origin edge signal has been detected (YES in step S109), the process proceeds to step S114 (see FIG. 2B).

If it is determined in step S105 that the iris mechanism 50 is positioned on the close side (NO in step S105), the process proceeds to step S110, where the connection switch 58 is turned off so that detection of the origin can be performed at a possible maximum speed by motor drive. In step S111, the iris mechanism 50 is driven in the open direction at the maximum speed. In step S112, the iris origin detector 60 detects an origin detection output signal. In step S113, it is determined whether an origin edge signal has been detected. If the origin edge signal has not been detected (NO in step S113), the process returns to step S112 and detection is continued. If the origin edge signal has been detected (YES in step S113), the process proceeds to step S114 (see FIG. 2B).

In step S114, an output value of the position detector 59 is detected. The output value obtained at this time corresponds to the origin in a relative position signal. Then, in step S115, the detected value is stored in the volatile storage unit 72. The stored value corresponds to the amount of rotation from the pre-initialization position: rectangular waves and sine waves output from an encoder or the like are processed and are regarded as high level/low level rectangular waves, the edges of the waves are counted, and the number is stored as the count from the pre-initialization position.

Then, in step S116, the iris motor 56 is stopped, whereby detection of the origin ends. Then, a routine of returning the position to the pre-initialization position is performed. In step S117, the pre-initialization position is read from the volatile storage unit 72. In step S118, the drive direction is reversed and driving the iris motor 56 at the maximum speed is started.

In step S119, an output value of the position detector 59 is detected. In step S120, it is determined whether the iris mechanism 50 is in the pre-initialization position. If the iris mechanism 50 is not in the pre-initialization position (NO in step S120), the process returns to step S119. If the iris mechanism 50 has reached the pre-initialization position (YES in step S120), the process proceeds to step S121, where the iris motor 56 is stopped.

Then, in step S122, the connection switch 58 is turned on so that normal servo drive can be performed. In step S123, a normal process is started and the drive of the iris mechanism 50 is controlled in response to an iris control signal from the camera apparatus 2. Then, in step S124, it is determined by the CPU 70 whether the power supply voltage is at a reference value or lower. If the power supply voltage is higher than the reference value (NO in step S124), the process returns to step S123 and the normal process continues. If the power supply voltage is at the reference value or lower (YES in step S124), the process proceeds to step S125, where the CPU 70 stops an external input/output process.

In this embodiment, descriptions have been given about the method for detecting the origin of the iris mechanism 50. This method can also be applied to the zoom lens unit 10 and the focus lens unit 30. This embodiment enables the origin detecting process of the iris mechanism 50, the zoom lens unit 10, and the focus lens unit 30 at power-on to be performed at speed higher than normal servo speed, so that the origin detection time is shortened. Furthermore, unnecessary operations of the lens apparatus 1 shown in the camera apparatus 2 can be reduced.

In the first embodiment, the iris mechanism 50 is driven at the maximum speed both at detection of the origin and at return to the pre-initialization position. Note that, in order to increase the precision of detecting the origin, the iris motor 56 is stopped after an origin edge signal has been detected, the drive speed is lowered after reverse, the drive speed is changed to the maximum speed again after an origin edge signal has been detected, and then the iris mechanism 50 is returned to the pre-initialization position.

FIG. 4 is a flowchart illustrating operations of detecting an origin of the iris mechanism 50 according to a second embodiment. In step S201, the position detector 59 detects a current relative position of the iris mechanism 50. In step S202, a detection value generated by the position detector 59 is set as a reference value of zero. In step S203, this position is regarded as a pre-initialization position and is stored in the volatile storage unit 72. In step S204, the iris origin detector 60 detects an origin detection output signal. In step S205, it is determined whether the iris mechanism 50 is positioned on an open side or a close side with respect to the origin on the basis of the detection result.

Figure 5:
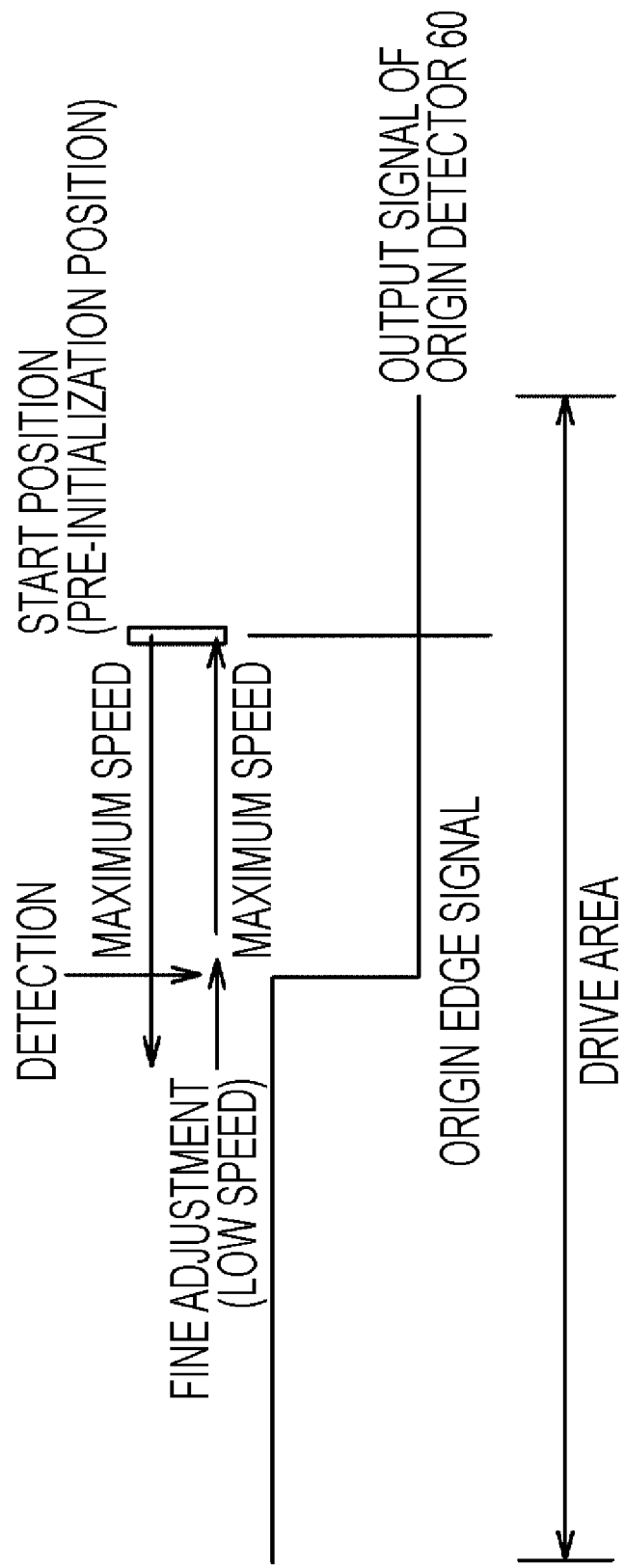
FIG. 5 illustrates an operation according to the second embodiment.

More specifically, as illustrated in FIG. 5, the iris mechanism 50 outputs an origin edge signal only once while moving in the drive area from one end to the other end, which causes a change from a high level to a low level or from a low level to a high level. On the basis of this signal, the iris origin detector 60 determines whether the iris mechanism 50 is positioned on the open side or the close side at power-on.

As a result of the determination, if the iris mechanism 50 is positioned on the open side (YES in step S205), the process proceeds to step S206. If the iris mechanism 50 is positioned on the close side (NO in step S205), the process proceeds to step S210. In step S206, the connection switch 58 is turned off so that detection of the origin can be performed at a possible maximum speed by motor drive. At normal servo, the feedback circuit operates and controls the speed so that an optimum speed for specified iris drive can be realized.

However, at detection of the origin, the connection switch 58 is turned off so that detection of the origin and return to the initial position can be performed in the shortest time. In some cases, the feedback circuit is not formed and speed control is performed only by a control signal from the CPU 70. In those cases, however, an output signal from the CPU 70 is controlled so that the iris motor 56 drives at a possible maximum speed.

In step S207, the iris mechanism 50 is driven in the close direction at the maximum speed. In step S208, the iris origin detector 60 detects an origin detection output signal. In step 209, it is determined whether an origin edge signal has been detected on the basis of the detection result. If the origin edge signal has not been detected (NO in step S209), the process returns to step S208 and detection is continued. If the origin edge signal has been detected (YES in step 209), the process proceeds to step S214.

If it is determined in step S205 that the iris mechanism 50 is positioned on the close side (NO in step S205), the process proceeds to step S210, where the connection switch 58 is turned off so that detection of the origin can be performed at a possible maximum speed by motor drive. In step S211, the iris mechanism 50 is driven in the open direction at the maximum speed. In step S212, the iris origin detector 60 detects an origin detection output signal. In step S213, it is determined whether an origin edge signal has been detected on the basis of the detection result.

Specifically, as described above, the point of change from a high level to a low level or from a low level to a high level is set as the origin. If the origin edge signal has not been detected (NO in step S213), the process returns to step S212 and detection is continued. If the origin edge signal has been detected (YES in step S213), the process proceeds to step S214.

In step S214, an output value of the position detector 59 is detected. The output value obtained at this time corresponds to the origin in a relative position signal. Then, in step S215, the detected value is stored as a first origin position in the volatile storage unit 72. The stored value corresponds to the amount of rotation from the pre-initialization position: rectangular waves and sine waves output from an encoder or the like are processed and are regarded as high level/low level rectangular waves, the edges of the waves are counted, and the number is stored as the count from the pre-initialization position. Then, the process proceeds to step S216, where the iris motor 56 is stopped.

Accordingly, detection of the origin ends. Then, a routine of returning the position to the pre-initialization position is performed. In step S217, the pre-initialization position is read from the volatile storage unit 72. In step S218 (see FIG. 4B), the connection switch 58 is turned on so that the speed of the iris motor 56 can be controlled and that the stored origin position can be finely adjusted. Then, the drive direction is reversed and low-speed driving by the iris motor 56 is started in step S219.

Then, in step S220, the iris origin detector 60 detects an origin detection signal. In step S221, it is determined whether an origin edge signal has been detected on the basis of the detection result generated by the iris origin detector 60. If the origin edge signal has not been detected (NO in step S221), the process returns to step S220 and detection is continued. If the origin edge signal has been detected (YES in step S221), the process proceeds to step S222.

In step S222, the position detector 59 detects a current relative position of the iris mechanism 50 at the time when the origin edge signal is detected. In step S223, the detected relative position is compared with the first origin position stored in step S215. If the both positions match (YES in step S223), the process proceeds to step S225. If the both positions do not match (NO in step S223), the process proceeds to step S224. In step S224, the detected relative position is replaced by the first origin position, which is stored in the volatile storage unit 72. This position serves as a datum point (origin) of the iris mechanism 50.

The origin position is set in this way. Then, in step S225, the connection switch 58 is turned off so that the position is returned to the pre-initialization position. In step S226, the iris drive speed is changed to the maximum speed.

In step S227, the position detector 59 detects an output value of a relative position. In step S228, it is determined whether the iris mechanism 50 is in the pre-initialization position. If the iris mechanism 50 is not in the pre-initialization position (NO in step S228), the process returns to step S227. If the iris mechanism 50 has reached the pre-initialization position (YES in step S228), the process proceeds to step S229, where the iris motor 56 is stopped. Then, in step S230, the connection switch 58 is turned on so that normal servo drive can be performed. Then, the process proceeds to step S231.

In step S231, the normal process is started and the drive of the iris mechanism 50 is controlled in response to an iris control signal from the camera apparatus 2. In the normal process state, it is determined by the CPU 70 whether the power supply voltage is at a reference value or lower in step S232. If the power supply voltage is higher than the reference value (NO in step S232), the process returns to step S231 and the normal process continues. If the power supply voltage is at the reference value or lower (YES in step S232), the process proceeds to step S233, where the CPU 70 stops the external input/output process.

In the second embodiment, descriptions have been given about the method for detecting the origin of the iris mechanism 50. This method can also be applied to the zoom lens unit 10 and the focus lens unit 30.

This embodiment enables the origin detecting process of the iris mechanism 50 and so on at power-on to be performed at speed higher than the normal servo speed, so that the origin detection time is shortened. Accordingly, unnecessary operations of the lens apparatus 1 shown in the camera apparatus 2 can be reduced. Furthermore, when the iris mechanism 50 returns to the pre-initialization position after first detection of the origin, detection of the origin is performed again in a fine-adjustment mode where the drive speed is low, whereby the origin can be set with high precision.

In the above-described first and second embodiments, descriptions have been given about the methods for performing detection of the origin and return to the pre-initialization position of the iris mechanism 50, the zoom lens unit 10, and the focus lens unit 30 at the maximum drive speed of the motor. The iris mechanism 50 can be controlled in a remote iris mode of driving the iris mechanism 50 by a control signal from an external controller, so as to control the exposure of a television camera. Also, the iris mechanism 50 can be controlled in an auto iris mode in which a CCD (charge-coupled device) included in the camera apparatus 2 detects the brightness of an image and controls the iris mechanism 50 so that the image captured by the television camera has appropriate brightness. Detection of the origin in the remote iris mode has been described above in the first and second embodiments. The third embodiment relates to a method for detecting the origin of the iris mechanism 50 in the auto iris mode.

In the auto iris mode, the iris mechanism 50 is driven in accordance with the brightness of a subject, and the quantity of light is adjusted to be constant by opening and closing the blades of the iris. For this purpose, the drive speed is adjusted by changing the gain of the power amplifier 55 in accordance with the combination of the lens apparatus 1 and the camera apparatus 2 so that hunting does not occur even if the quantity of light suddenly changes. Therefore, the drive speed in the auto iris mode is the same or lower than that in the remote iris mode.

Figures 6, 6A, 6B:
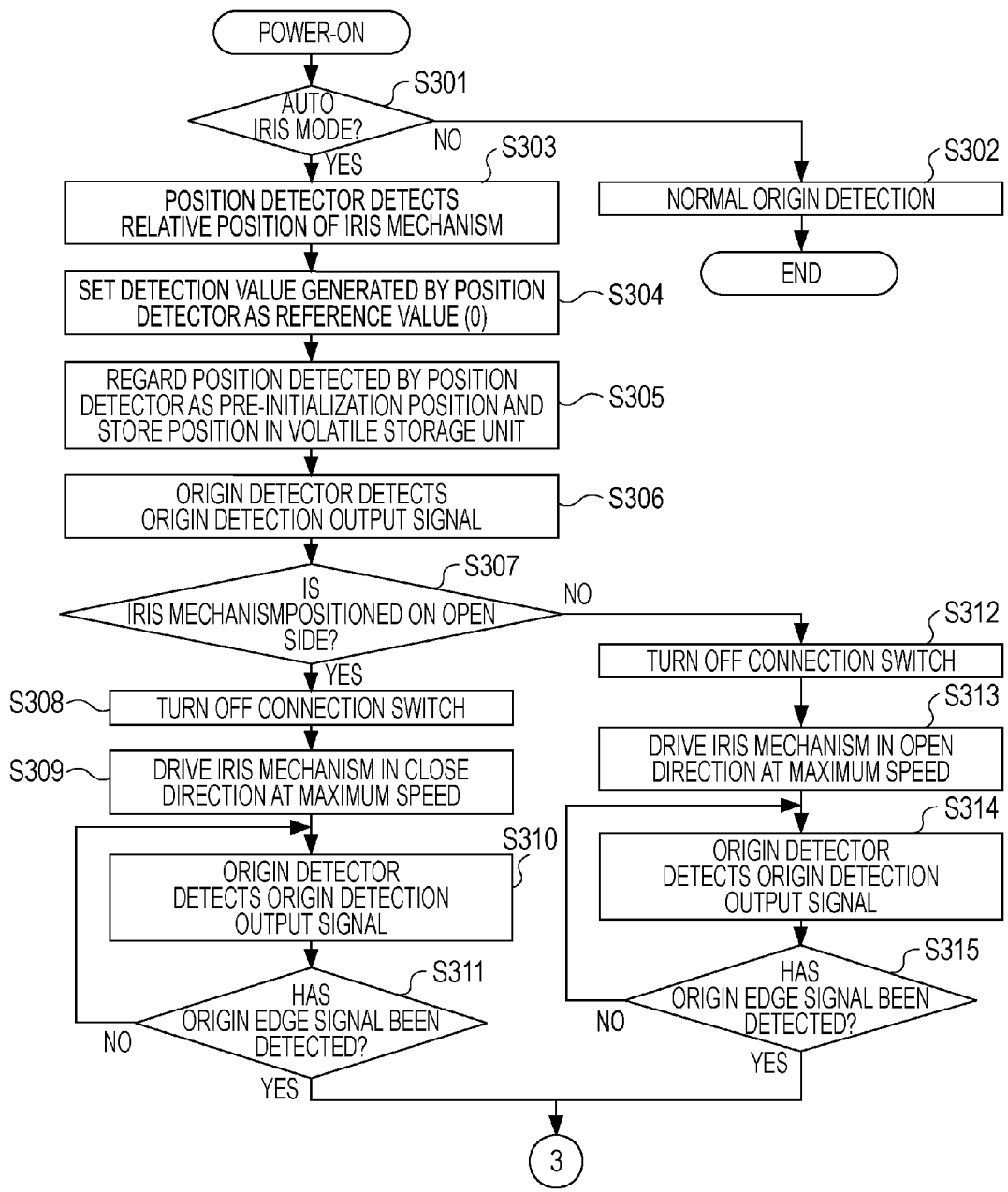
FIG. 6 is a flowchart of operations according to a third embodiment.
Figure 6B:
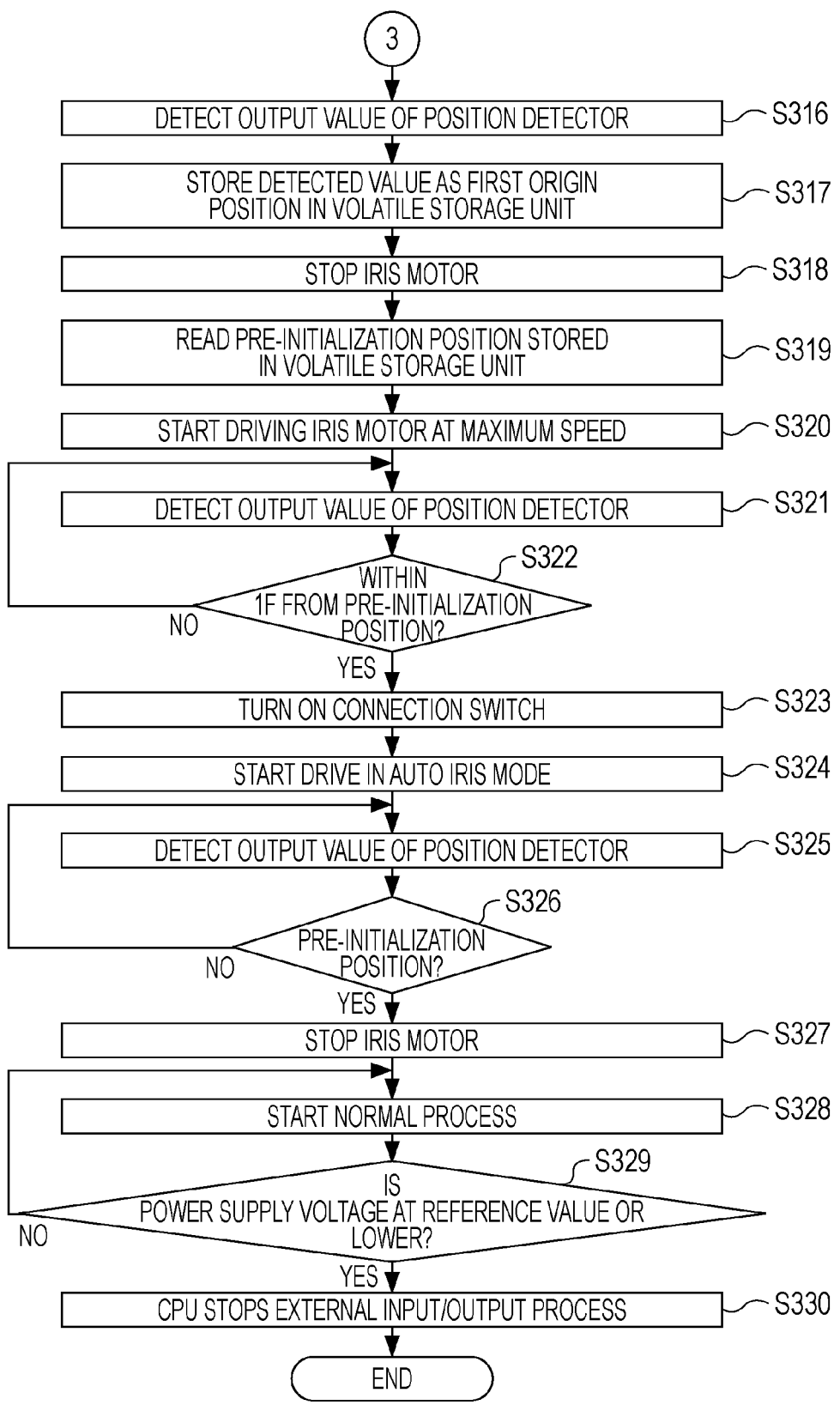

FIG. 6 is a flowchart illustrating operations according to the third embodiment. In step S301, it is determined whether the iris mode is set to the auto iris mode. As a result of the determination, if the iris mode is set to the remote iris mode (NO in step S301), the process proceeds to step S302 and the routine ends to perform the normal origin detection according to the first and second embodiments.

If the iris mode is set to the auto iris mode (YES in step S301), the process proceeds to step S303, where the position detector 59 detects a current relative position of the iris mechanism 50. In step S304, the current position detected by the position detector 59 is set as a reference value of zero. In step S305, this position is regarded as a pre-initialization position and is stored in the volatile storage unit 72. In step S306, the iris origin detector 60 detects a current origin detection signal. Then, the process proceeds to step S307.

In step S307, it is determined whether the iris mechanism 50 is positioned on an open side or a close side with respect to the origin on the basis of the detection result generated by the iris origin detector 60 to detect the origin of the iris mechanism 50. More specifically, as illustrated in FIG. 7, the iris mechanism 50 outputs an origin edge signal only once while moving in the drive area from one end to the other end, which causes a change from a high level to a low level or from a low level to a high level. On the basis of this signal, the iris origin detector 60 can determine whether the iris mechanism 50 is positioned on the open side or the close side at power-on.

As a result of the determination, if the iris mechanism 50 is positioned on the open side (YES in step S307), the process proceeds to step S308. If the iris mechanism 50 is positioned on the close side (NO in step S307), the process proceeds to step S312. In step S308, the connection switch 58 is turned off so that detection of the origin can be performed at a possible maximum speed by motor drive. At normal servo, the feedback circuit operates and controls the speed so that an optimum speed for specified iris drive can be realized.

However, at detection of the origin, the connection switch 58 is turned off so that detection of the origin and return to the pre-initialization position can be performed in the shortest time. In some cases, the feedback circuit is not formed and speed control is performed only by a control signal from the CPU 70. In those cases, however, an output signal from the CPU 70 is controlled so that the iris motor 56 drives at a possible maximum speed.

In step S309, the iris mechanism 50 is driven in the close direction at the maximum speed. In step S310, the iris origin detector 60 detects an origin detection output signal. In step 311, it is determined whether an origin edge signal has been detected on the basis of the detection result. If the origin edge signal has not been detected (NO in step S311), the process returns to step S310 and detection is continued. If the origin edge signal has been detected (YES in step S311), the process proceeds to step S316.

If it is determined in step S307 that the iris mechanism 50 is positioned on the close side (NO in step S307), the process proceeds to step S312, where the connection switch 58 is turned off so that detection of the origin can be performed at a possible maximum speed by motor drive. In step S313, the iris mechanism 50 is driven in the open direction at the maximum speed. In step S314, the iris origin detector 60 detects an origin detection output signal. In step S315, it is determined whether an origin edge signal has been detected on the basis of the detection result. If the origin edge signal has not been detected (NO in step S315), the process returns to step S314 and detection is continued. If the origin edge signal has been detected (YES in step S315), the process proceeds to step S316 (see FIG. 6B).

In step S316, an output value of the position detector 59 is detected. The output value obtained at this time corresponds to the origin in a relative position signal. Then, in step S317, the detected value is stored as a first origin position in the volatile storage unit 72. The stored value corresponds to the amount of rotation from the pre-initialization position: rectangular waves and sine waves output from an encoder or the like are processed and are regarded as high level/low level rectangular waves.

Then, the edges of the waves are counted, and the number is stored as the count from the pre-initialization position. Then, in step S318, the iris motor 56 is stopped, whereby detection of the origin ends. Then, a routine of returning the position to the pre-initialization position is performed. In step S319, the pre-initialization position is read from the volatile storage unit 72. In step S320, the drive direction of the iris motor 56 is reversed and driving at the maximum speed is started.

In step S321, the position detector 59 detects an output value of the relative position of the iris mechanism 50. In step S322, it is determined whether the iris mechanism 50 is within "1F" from the pre-initialization position. If the iris mechanism 50 is not within "1F" from the pre-initialization position (NO in step S322), the process returns to step S321. If the iris mechanism 50 has reached a position within "1F" from the pre-initialization position (YES in step S322), the process proceeds to step S323.

"1F" is an indicator indicating the brightness of the iris mechanism 50 and is proportional to the rotation angle of the iris ring 52. In accordance with the count value of the relative position signal output from the position detector 59, the count corresponding to "1F" is stored in the CPU 70 in advance. In the third embodiment, "1F" is used as a comparison value. Alternatively, any specified value larger or lower than "1F", such as "2F" or "0.5F", may be used. Also, a simple count value may be used.

If the iris mechanism 50 is within "1F" (YES in step S322), the process proceeds to step S323, where the connection switch 58 is turned on so that speed control can be performed. Then, drive in the auto iris mode starts in step S324. In step S325, the position detector 59 detects a current relative position of the iris mechanism 50. In step S326, if the detected relative position has reached the pre-initialization position stored in step S305 (YES in step S326), the process proceeds to step S327, where the iris motor 56 is stopped. If the relative position does not match the pre-initialization position (NO in step S326), the process returns to step S325.

Then, in step S328, the normal process is started and the drive of the iris mechanism 50 is controlled in response to an iris control signal from the camera apparatus 2. In the normal process state, it is determined by the CPU 70 whether the power supply voltage is at a reference value or lower in step S329. If the power supply voltage is higher than the reference value (NO in step S329), the process returns to step S328 and the normal process continues. If the power supply voltage is at the reference value or lower (YES in step S329), the process proceeds to step S330, where the CPU 70 stops an external input/output process.

The third embodiment enables the origin detecting process of the iris mechanism 50 at power-on to be performed at speed higher than the normal servo speed, so that the origin detection time is shortened. Accordingly, unnecessary operations of the lens apparatus 1 shown in the camera apparatus 2 can be reduced. Furthermore, when the iris mechanism 50 returns to the pre-initialization position after first detection of the origin, the drive speed is set to the maximum speed and then the auto iris mode is set before the iris mechanism 50 returns to the pre-initialization position, whereby hunting peculiar to the lens system can be prevented. Also, images can be captured without a negative effect of hunting or the like, causing a change in brightness of images, at the start of capturing after initialization.

In the third embodiment, the motor drive speed is set to the maximum speed at detection of the origin of the iris mechanism 50 and at return to the pre-initialization position, and the iris mode is switched to the auto iris mode before the pre-initialization position.

In a fourth embodiment, the motor is stopped after an origin edge signal has been detected, the drive speed is lowered after reverse, and the drive speed is changed to the maximum speed after an origin edge signal has been detected.

Figure 8B:
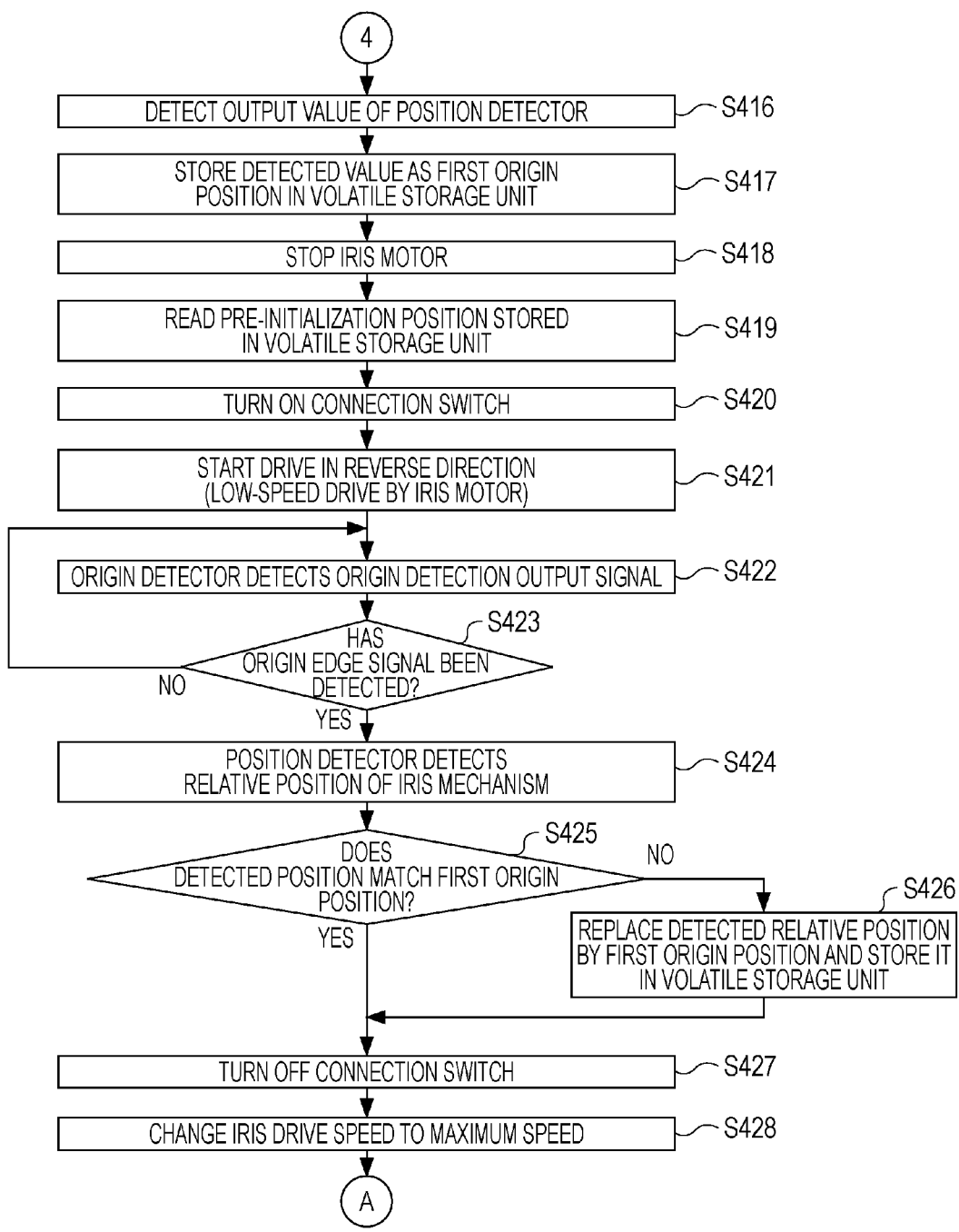
FIG. 8 is a flowchart of operations according to a fourth embodiment.
Figure 9:
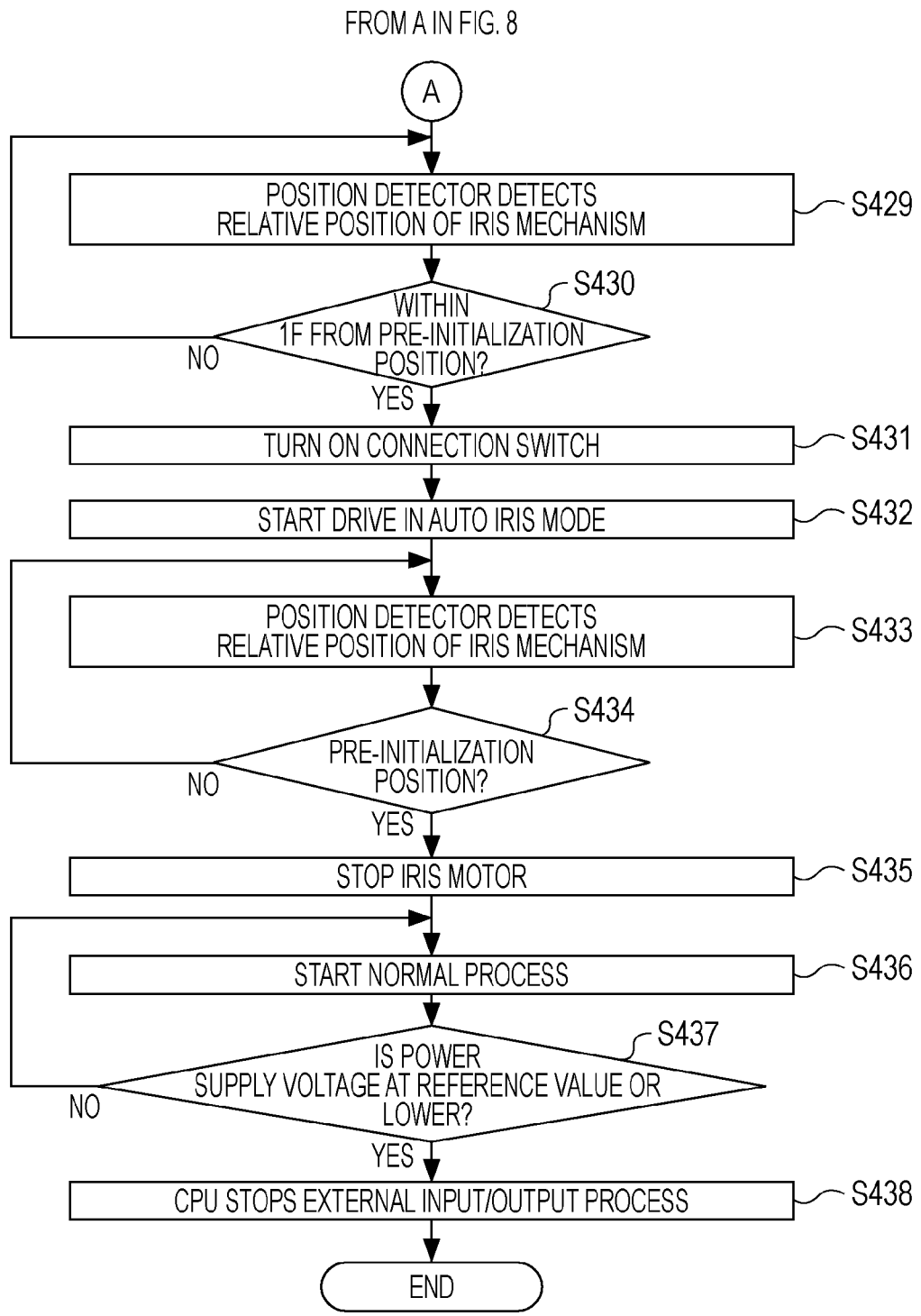
FIG. 9 is a flowchart of operations according to the fourth embodiment.

FIGS. 8 and 9 are flowcharts illustrating operations according to the fourth embodiment. In step S401, it is determined whether the iris mode is set to the auto iris mode. As a result of the determination, if the iris mode is set to the remote iris mode (NO in step S401), the process proceeds to step S402 and the routine ends to perform the normal origin detection according to the first and second embodiments. If the iris mode is set to the auto iris mode (YES in step S401), the process proceeds to step S403.

In step S403, the position detector 59 detects a current relative position of the iris mechanism 50. In step S404, the current position detected by the position detector 59 is set as a reference value of zero. In step S405, this position is regarded as a pre-initialization position and is stored in the volatile storage unit 72. In step S406, the iris origin detector 60 detects a current origin detection output signal. In step S407, it is determined whether the iris mechanism 50 is positioned on an open side or a close side with respect to the origin on the basis of the detection result.

More specifically, as illustrated in FIG. 10, the iris mechanism 50 outputs an origin edge signal only once while moving in the drive area from one end to the other end, which causes a change from a high level to a low level or from a low level to a high level. On the basis of this signal, the iris origin detector 60 determines whether the iris mechanism 50 is positioned on the open side or the close side at power-on.

As a result of the determination, if the iris mechanism 50 is positioned on the open side (YES in step S407), the process proceeds to step S408. If the iris mechanism 50 is positioned on the close side (NO in step S407), the process proceeds to step S412. In step S408, the connection switch 58 is turned off so that detection of the origin can be performed at a possible maximum speed by motor drive. At normal servo, the feedback circuit operates and controls the speed so that an optimum speed for specified iris drive can be realized.

However, at detection of the origin, the connection switch 58 is turned off so that detection of the origin and return to the pre-initialization position can be performed in the shortest time. In some cases, the feedback circuit is not formed and speed control is performed only by a control signal from the CPU 70. In those cases, however, an output signal from the CPU 70 is controlled so that the iris motor 56 drives at a possible maximum speed.

In step S409, the iris mechanism 50 is driven in the close direction at the maximum speed. In step S410, the iris origin detector 60 detects an origin detection output signal. In step 411, it is determined whether an origin edge signal has been detected on the basis of the detection result. As described above, this corresponds to the detection illustrated in FIG. 10, with the point of change from a high level to a low level or from a low level to a high level being an origin. If the origin edge signal has not been detected (NO in step S411), the process returns to step S410 and detection is continued. If the origin edge signal has been detected (YES in step S411), the process proceeds to step S416 (see FIG. 8B).

If it is determined in step S407 that the iris mechanism 50 is positioned on the close side (NO in step S407), the process proceeds to step S412, where the connection switch 58 is turned off so that detection of the origin can be performed at a possible maximum speed by motor drive. In step S413, the iris mechanism 50 is driven in the open direction at the maximum speed. In step S414, the iris origin detector 60 detects an origin detection output signal. In step S415, it is determined whether an origin edge signal has been detected on the basis of the detection result. If the origin edge signal has not been detected (NO in step S415), the process returns to step S414 and detection is continued. If the origin edge signal has been detected (YES in step S415), the process proceeds to step S416 (see FIG. 8B).

In step S416, an output value of the position detector 59 is detected. The output value obtained at this time corresponds to the origin in a relative position signal. Then, in step S417, the detected value is stored as a first origin position in the volatile storage unit 72. The stored value corresponds to the amount of rotation from the pre-initialization position: rectangular waves and sine waves output from an encoder or the like are processed and are regarded as high level/low level rectangular waves. Then, the edges of the waves are counted, and the number is stored as the count from the pre-initialization position.

Then, in step S418, the iris motor 56 is stopped, whereby detection of the origin ends. Then, a routine of returning the position to the pre-initialization position is performed. In step S419, the pre-initialization position is read from the volatile storage unit 72. In step S420, the connection switch 58 is turned on so that the speed of the iris motor 56 can be controlled and that the stored origin position can be finely adjusted. Then, the drive direction is reversed and low-speed drive is started by the iris motor 56 in step S421.

Then, in step S422, the iris origin detector 60 detects an origin detection output signal. In step S423, it is determined whether an origin edge signal has been detected on the basis of the detection result. If the origin edge signal has not been detected (NO in step S423), the process returns to step S422 and detection is continued. If the origin edge signal has been detected (YES in step S423), the process proceeds to step S424, where the position detector 59 detects a current relative position of the iris mechanism 50 at the time when the origin edge signal is detected.

In step S425, the detected relative position is compared with the first origin position stored in step S417. If the both positions match (YES in step S425), the process proceeds to step S427. If the both positions do not match (NO in step S425), the process proceeds to step S426. In step S426, the detected relative position is updated to the first origin position, which is stored in the volatile storage unit 72. This position serves as a datum point (origin) of the iris mechanism 50.

The origin position is set in this way. Then, in step S427, the connection switch 58 is turned off so that the position is returned to the pre-initialization position. In step S428, the iris drive speed is changed to the maximum speed.

In step S429 (see FIG. 9), the position detector 59 detects an output value of the relative position of the iris mechanism 50. In step S430, it is determined whether the iris mechanism 50 is within "1F" from the pre-initialization position. If the iris mechanism 50 is not within "1F" from the pre-initialization position (NO in step S430), the process returns to step S429. If the iris mechanism 50 has reached a position within "1F" from the pre-initialization position (YES in step S430), the process proceeds to step S431.

If the iris mechanism 50 is within "1F", the process proceeds to step S431, where the connection switch 58 is turned on so that speed control can be performed. Then, drive in the auto iris mode starts in step S432. In step S433, the position detector 59 detects a current relative position of the iris mechanism 50. In step S434, it is determined whether the detected relative position has reached the pre-initialization position stored in step S405. If the detected relative position has reached the pre-initialization position (YES in step S434), the process proceeds to step S435, where the iris motor 56 is stopped. If the relative position has not reached the pre-initialization position (NO in step S434), the process returns to step S433.

Then, in step S436, the normal process is started and the drive of the iris mechanism 50 is controlled in response to an iris control signal from the camera apparatus 2. In the normal process state, it is determined by the CPU 70 whether the power supply voltage is at a reference value or lower in step S437. If the power supply voltage is higher than the reference value (NO in step S437), the process returns to step S436 and the normal process continues. If the power supply voltage is at the reference value or lower (YES in step S437), the process proceeds to step S438, where the CPU 70 stops an external input/output process.

The fourth embodiment enables the origin detecting process of the iris mechanism 50 at power-on to be performed at speed higher than normal servo speed, so that the origin detection time is shortened. Accordingly, unnecessary operations of the lens apparatus 1 shown in the camera apparatus 2 can be reduced. Furthermore, when the iris mechanism 50 returns to the pre-initialization position after first detection of the origin, detection of the origin is performed again in a fine adjustment mode with low drive speed, whereby the origin can be precisely set.

Furthermore, at return to the pre-initialization position after second detection of the origin, the drive speed is set to the maximum speed and then the auto iris mode is set before the iris mechanism 50 returns to the pre-initialization position, whereby hunting peculiar to the lens system can be prevented. Also, images can be captured without a negative effect of hunting or the like, causing a change in brightness of images, at the start of capturing after initialization.

In the fourth embodiment, at return to the pre-initialization position after the first detection of the origin, the iris drive speed is lowered and the origin is determined again. Then, the drive speed at return to the pre-initialization position is set to the maximum speed. Alternatively, according to a modification, the speed may be the drive speed of the remote iris mode.

According to another modification, return to the pre-initialization position may be performed in the auto iris mode.

In the third and fourth embodiments, the iris mechanism 50 returns to the pre-initialization position after the origin has been detected. Alternatively, the iris mechanism 50 may return to the position indicated by an iris control signal output from the camera apparatus 2 at the end of origin detection, instead of the pre-initialization position.

In the lens apparatus according to the embodiments, the drive speed of the optical element at detection of the origin performed at power-on is higher than the normal servo speed, so that operations can be reduced.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions. For example, the lens apparatus described in the embodiments may be attachable to/detachable from the main body of an image pickup apparatus (camera). Of course, the embodiments may be applied to an image pickup apparatus including the lens apparatus (apparatus integrated with the lens apparatus). The embodiments are effective when being applied to an image pickup apparatus to capture moving images or to a lens apparatus attachable to/detachable from an image pickup apparatus to capture moving images.

This application claims the benefit of Japanese Patent Application No. 2008-060934 filed Mar. 11, 2008, which is hereby incorporated by reference herein in its entirety.

What is claimed is:

1. A lens apparatus including an optical element, the lens apparatus comprising:
    a motor configured to drive the optical element;
    a position detector configured to detect a relative position of the optical element; and
    a controller configured to detect an origin of the optical element by returning the optical element to the origin by controlling the motor,
    wherein the controller controls the motor so that a speed of the optical element moving to the origin is higher than a speed of the optical element moved by an operation of an operator.

2. The lens apparatus according to claim 1,
    wherein the controller returns the optical element to the origin just after power-on of the lens apparatus so as to detect the origin.

3. The lens apparatus according to claim 2,
    wherein the controller returns the optical element to the position at the power-on after returning the optical element to the origin.

4. The lens apparatus according to claim 3,
    wherein at least part of the speed of the optical element moving from the origin to the position at the power-on is higher than the speed of the optical element moved by the operation of the operator.

5. The lens apparatus according to claim 3,
    wherein the optical element is a variable aperture,
    wherein the lens apparatus has an auto iris mode of adjusting the variable aperture to reduce change in quantity of light passing through the lens apparatus, and
    wherein the lens apparatus executes the auto iris mode before the variable aperture reaches the position at the power-on when the variable aperture returns to the position at the power-on after returning to the origin.

6. The lens apparatus according to claim 1,
    wherein the speed of the optical element moving to the origin is higher than a maximum speed of the optical element moved by the operation of the operator.

7. The lens apparatus according to claim 1,
    wherein the optical element is any of a zoom lens unit and a focus lens unit, and
    wherein the motor drives any of the zoom lens unit and the focus lens unit in an optical-axis direction.

8. The lens apparatus according to claim 1,
    wherein the optical element is a variable aperture, and
    wherein the motor adjusts an opening diameter of the variable aperture.

9. An image pickup apparatus comprising:
    an image pickup device; and
    a lens apparatus configured to guide captured light to the image pickup device,
    wherein the lens apparatus includes
        an optical element;
        a motor configured to drive the optical element;
        a position detector configured to detect a relative position of the optical element; and
        a controller configured to detect an origin of the optical element by returning the optical element to the origin by controlling the motor,
        wherein the controller controls the motor so that a speed of the optical element moving to the origin is higher than a speed of the optical element moved by an operation of an operator.

* * * * *